Aug. 23, 1938. H. J. LOFTIS 2,127,979
RESILIENT MOUNTING FOR MOTORS AND GENERATORS
Filed Dec. 18, 1936
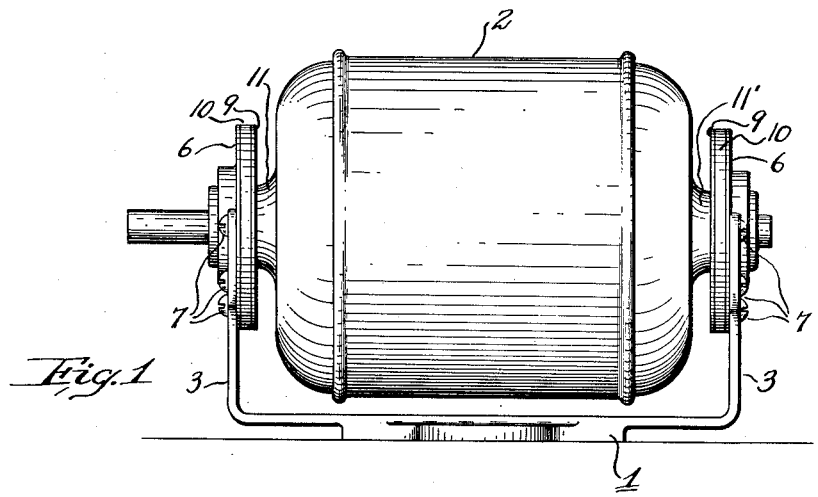
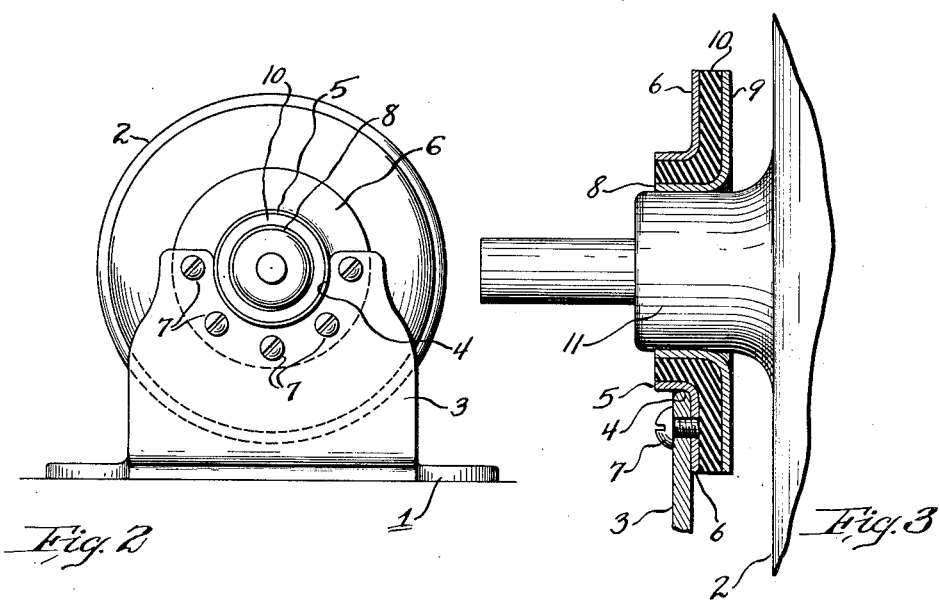
INVENTOR.
Homer J. Loftis,
BY
George D. Richards
ATTORNEY.

Patented Aug. 23, 1938

2,127,979

UNITED STATES PATENT OFFICE 2,127,979

RESILIENT MOUNTING FOR MOTORS AND GENERATORS

Homer J. Loftis, Ironton, Ohio, assignor to Henrite Products Corporation, Ironton, Ohio, a corporation of Ohio Application December 18, 1936, Serial No. 116,472

1 Claim. (Cl. 248—26)

This invention relates, generally, to means for supporting motors, generators and the like, and the invention has reference, more particularly, to a novel resilient mounting for supporting the ends of motors, generators and the like.

Resilient mountings for generators and motors as heretofore generally constructed, have not been entirely satisfactory in use because of the lack of uniform distribution of stress throughout the resilient body of the mountings. Thus, those portions of the mountings subjected to direct compressional force, due to the load or weight of the machine, are stressed far more than those portions of the mountings which are not subjected to this compressional force. In fact, the majority of rubber mountings heretofore used, employ loose rubber bushings which are inserted between metal plates of the mountings so that the rubber bushing is only capable of taking compressible forces, with the result that the portion of the rubber bushing directly underlying the supported surfaces carries all the stress, causing undue compression of this portion of the rubber and resulting in a relatively large transmission of noise and vibration therethrough.

The principal object of the present invention is to provide a novel resilient motor and generator mounting that is so constructed and arranged that the same serves in effect as an elastic suspension for the supported motor or generator, whereby the load stresses are carried by all portions of this supporting resilient mounting largely as tensile and shearing stresses, whereby the effectiveness of the mounting in deadening vibration and noise is greatly increased over those mountings wherein the rubber is subjected to substantially purely compressional stresses.

Another object of the present invention lies in the provision of a novel resilient motor and generator mounting of the above character consisting of spaced sleeves having end flanges between which sleeves and flanges the resilient rubber portion thereof is molded, whereby the natural shrinkage of the rubber on cooling sets up tensile stresses in the rubber body extending radially with respect to the longitudinal axis of the supported motor or generator, thereby acting to suspend the latter rather than carry the same by compressional forces, while at the same time shearing stresses are set up in planes perpendicular to the planes of shrinkage, thereby providing both shear and tensile initial stresses in the rubber prior to the application of the load thereto.

Other objects of this invention, not at this time more particularly enumerated, will be clearly understood from the following detailed description of the same.

The invention is clearly illustrated in the accompanying drawing, in which:

Fig. 1 is a view in side elevation of a motor carried by the novel resilient mountings of this invention;

Fig. 2 is an end view of the structure shown in Fig. 1; and

Fig. 3 is an enlarged fragmentary part sectional view showing a resilient bushing in vertical section.

Similar characters of reference are employed in said views, to indicate corresponding parts.

Referring now to said drawing, the reference numeral 1 designates a cradle for axially supporting the motor 2. The cradle 1 has upstanding end portions or pedestals 3 provided with upper substantially semi-circular recesses or pockets 4 for receiving and supporting the novel resilient mountings of this invention. Each mounting comprises an outer sleeve 5 adapted to set into the recess 4, this outer sleeve being provided with an inner annular end flange 6 of greater radial dimension than the length of the sleeve 5. Sleeve 5 is adapted to be secured to the end portion 3 as by screws 7 extending through apertures provided in end portion 3 and threaded into apertures provided in the flange 6.

The resilient mounting is also provided with an inner sleeve 8 that is spaced from the outer sleeve 5 and is also provided with an inner end flange 9 similar to the end flange 6 of sleeve 5. A body of soft-resilient rubber 10 is contained between sleeves 5 and 8 and is molded to these sleeves and to the flanges thereof. The inner sleeves 8 of the mountings have pressed fits upon the motor housing end projections or axial extensions 11 and 11', and, if desired, the outer sleeves 5 instead of being secured as by screws 7 to the end portions 3 of the cradle may be secured to the end portions by pressed fits.

The natural shrinkage of the rubber body 10, taking place after the molding operation, results in outwardly directed radial tensile stresses being set up in the rubber body 10 between the inner and outer sleeves 8 and 5. Likewise tensile stresses, longitudinally directed, are set up in the rubber body between the flanges 9 and 6 of the sleeves. Since the diameters of the sleeves are fixed, the outwardly directed radial tensile stresses in the rubber body existing between sleeves 5 and 8 are not relieved, whereby the rubber body tends to pull the inner sleeve 8 radially outward in all directions, so that the motor housing extensions 11 and 11' are supported largely by tensile stresses existing throughout the annular body of rubber surrounding the same, whereby the whole annular body of rubber is substantially uniformly stressed, and that portion underlying the outer extension 11 does not alone carry the load as a compressional stress as is common in mountings heretofore used.

It also will be noted that the tensile stress in the body of the rubber lying between flanges 6 and 9 acts in a longitudinal direction and hence acts to pull these flanges together somewhat, thereby setting up longitudinal shearing stresses on the inside diameter of the outer sleeve 5 and on the outside diameter of the inner sleeve 8. This combination of tensile and shearing stresses in the rubber body serves to greatly raise the sound periodicity of the mounting, whereby sound waves and other vibration created by operation of the motor 2 are far more effectively deadened than when using a mounting wherein the rubber stresses are merely of the compressional type and are confined largely to the region under the motor projections or extensions 11, 11'.

It will be noted that vibrations of the motor 2, whether in a radial or longitudinal direction, or a resultant of these directions, is transmitted through an initially tensed rubber body or diaphragm which, owing to such tension, resulting from the vulcanization of the rubber to both sleeve members, very effectively deadens the vibration and noise of the motor.

While resilient rubber has been described as the resilient supporting material of the mounting, it is to be understood that any resilient material capable of being bonded to metal may be used in lieu of rubber and the expression "resilient rubber" occurring in the folowing claim is intended to cover such equivalent materials. Other types of materials which may be used are "Duprene", Karoseal rubber chloride, "Vinylite", "Ethanite", etc.

Owing to the manner of supporting the motor 2, i. e. by supporting the axial extensions 11 and 11' upon the resilient mountings, if a severe load or strain should occur and be great enough to tear the bond of the mounting resilient material, it would still be impossible for the motor 2 to become displaced from its cradle and this is a highly desirable safety feature of the mountings. Due to the nature of the stresses in the resilient material of the mountings, enabling the use of but a relatively thin layer of the material, the motor or other member supported is subject to but small displacements under load as is desirable.

As many changes could be made in the above construction and many apparently widely different embodiments of this invention could be made without departing from the scope thereof, as defined by the following claim, it is intended that all matter contained in the above description or shown in the accompanying drawing shall be interpreted as illustrative and not in a limiting sense.

I claim:

In a resilient mounting for supporting motors, generators and similar machines, an inner sleeve member having a radially extending end flange, a spaced outer sleeve member also having an end flange, and a body of resilient rubber interposed between and molded and bonded to said sleeves and their flanges, the natural shrinkage of said rubber body after molding serving to produce stresses in said rubber body of both shear and tension in three dimensions.

HOMER J. LOFTIS.